United States Patent [19]

Baccetti

[11] 4,441,231
[45] Apr. 10, 1984

[54] MASSAGER FOR LARGE MEAT SECTIONS
[75] Inventor: Valerio A. Baccetti, San Leandro, Calif.
[73] Assignee: American Food Equipment Co., Hayward, Calif.
[21] Appl. No.: 328,206
[22] Filed: Dec. 7, 1981
[51] Int. Cl.³ ............................................. A22C 9/00
[52] U.S. Cl. ..................................... 17/25; 366/320; 426/519
[58] Field of Search ................. 17/25; 100/DIG. 910; 426/519; 366/66, 300, 319, 320

[56] References Cited
U.S. PATENT DOCUMENTS
3,377,000  4/1968  Mason, Jr. ....................... 366/319 X
4,356,206 10/1982  Boldt ................................. 426/519

FOREIGN PATENT DOCUMENTS
1232905  5/1971  United Kingdom .................... 17/25

Primary Examiner—Willie G. Abercrombie
Attorney, Agent, or Firm—Flehr, Hohbach, Test, Albritton & Herbert

[57] ABSTRACT

A top loading, side discharge vacuum massage apparatus, has a spaced pair of agitators rotating about horizontal axes in upward counter-rotation. The tub sidewalls enshroud the agitators over 180° of angle and above the horizontal plane to promote the massage action in the zone between the agitators at the medial section of the tub.

9 Claims, 5 Drawing Figures

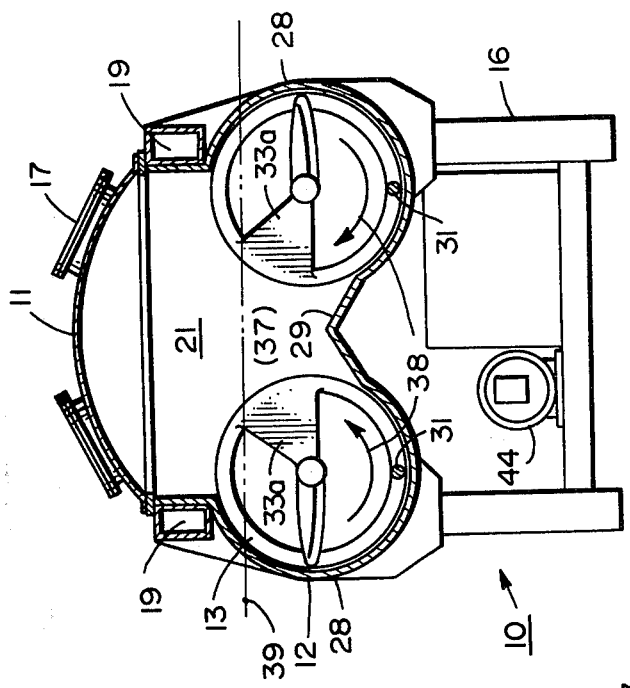
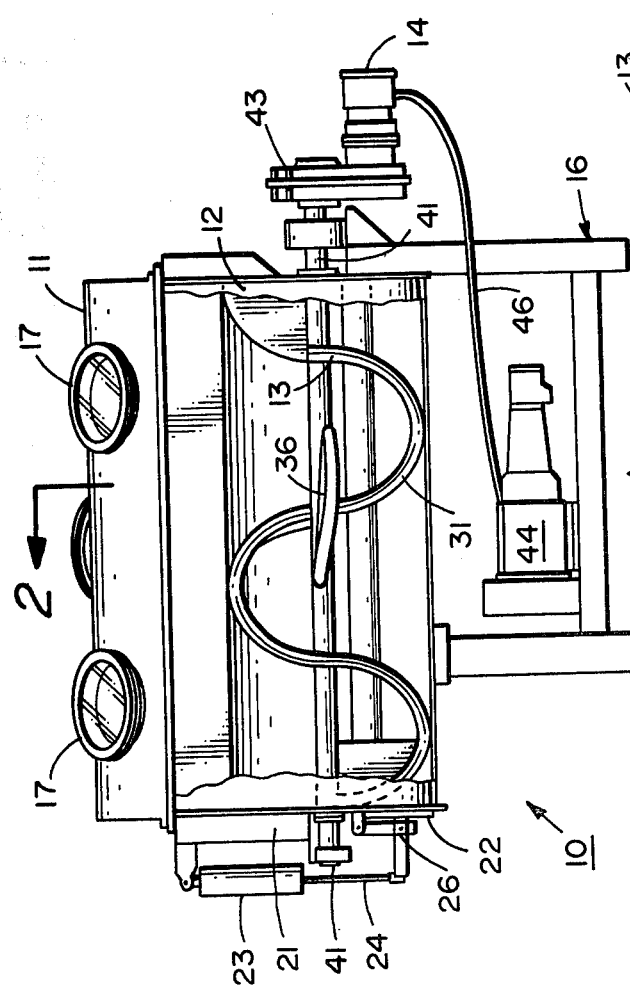
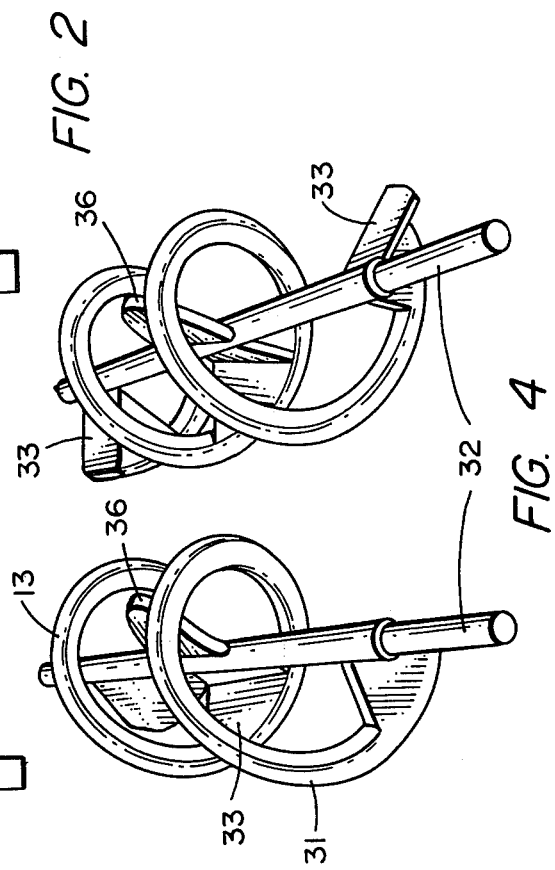

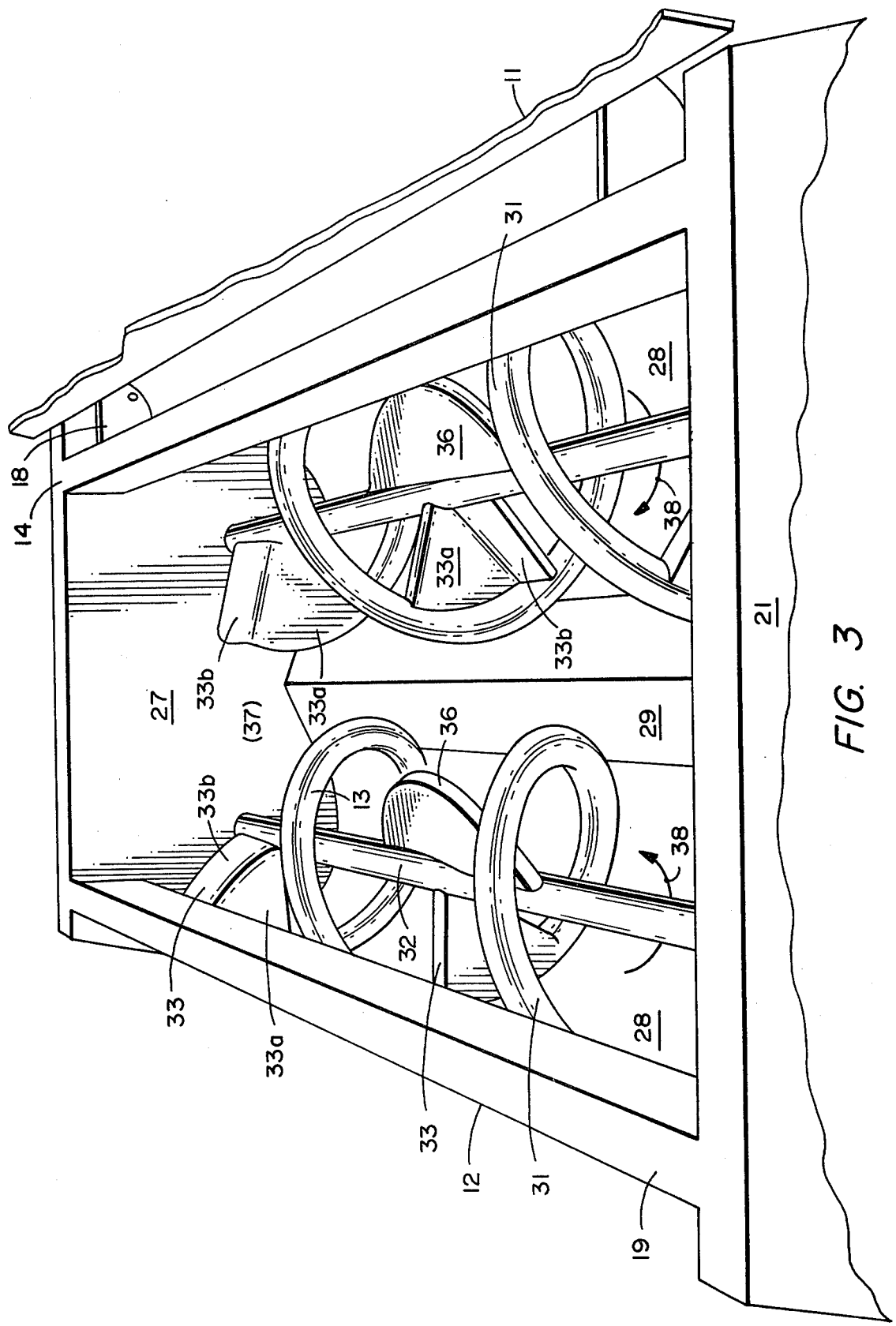

MASSAGER FOR LARGE MEAT SECTIONS

This invention pertains to meat processing and particularly concerns an improved machine for massaging meat in large muscle sections.

In the processing of meat, and particularly pickled meat such as ham, corned beef and similar products, it is known that absorption of the pickling solution is enhanced if the meat after pickling is "worked." Tumbling, vibrating and shaking actions have all been applied to work the meat for promoting release of the salt soluble exudate and to afford a more tender meat product. The equipment used for these procedures—vibrators, tumblers, mixers, etc.—had shortcomings of either requiring too long a time for processing meat and thus proportionately reducing the plant output or were too vigorous and severe in acting upon the meat product. In many cases tearing, bruising and abrading of the large muscle sections was found in product worked by those machines.

Tearing and abrading the large muscle sections was found to occur in the prior machinery at "pinch points" created between the movable agitators, rotors or the like and the sidewalls of the meat containment vessel or tub. In many instances the rotors or agitators themselves were equipped with sharp edges, no doubt for the purpose of better scraping the sidewalls of the tub, but it was this structural arrangement which was found to cause the tearing and bruising of the large meat sections. In other instances the agitators were equipped with paddles or ribbons were mounted in an over-lap relationship for the purpose of achieving a very good mixing action. But these arrangements were found also to create pinch points which produced bruised meat. While the above described devices "worked" large muscle sections fairly well, they have also produced a substantial amount of torn, pinched and bruised meat product which is unsatisfactory to the high quality meat processor.

In summary, the invention resides in an apparatus for meat massaging including a tub equipped with a product discharge and means for selectively opening and closing it. A pair of spaced apart agitators are arranged in the tub and include parallel shafts extending longitudinally of the tub and mounted for rotation with drive means coupled to each shaft adjacent the end of the tub opposite from the discharge end. Drive means rotate the agitators in an upward, counter-rotational direction. Each agitator includes a ribbon extending about each shaft in a helix coaxial with the shaft, the helix being circular in lateral cross section and having a smooth outer periphery. The inside surface walls of the tub are curved to enshroud the helical ribbon over at least 180° of its rotation. First and second baffles are arranged on the agitator and are connected to the shafts. The first baffle extends from the shaft to the ribbon and include a portion extending generally axially of the shaft and another portion extending generally radially of the shaft. A second baffle is arranged on a central portion of the shaft and extends substantially axially there along to project outwardly from the shaft into the gap of the ribbon helix. The arrangement of the agitator with respect to the tub is such that pinch points are minimized and the random recirculation of the product within the tub such that product action is more vigorous in the central portion of the tub between the two agitators with the product being moved upwardly through action of the baffles.

An object of the invention is to provide an improved apparatus for massaging meat of large muscle section which will reduce the bruising, tearing or shearing treatment of meat by minimizing the opportunity to pinch or jam meat portions between relatively moving metal parts.

Another object of the invention is to provide an improved meat massage machine which achieves the massage effect of promoting release of salt soluble exudate in a more gentle action of working the product against itself as contrasted to working the product against metal paddles, agitators, and the like.

Another object of the invention is to provide an improved meat massage machine which achieves a massaging effect with a random path of product recirculation.

Another object of the invention is to provide an improved meat massage unit wherein during circulation and recirculation of the meat product the opportunity for sheer action between the meat product and the metal portions of the machine is materially reduced.

These and other objects of the invention will become apparent from the description which follows taken in connection with the drawings of a preferred form of the invention in which:

FIG. 1 is a side elevation view, partially broken away, of an improved meat massage apparatus of the present invention;

FIG. 2 is a transverse sectional view of the machine in FIG. 1 taken in the direction of the arrows 2—2;

FIG. 3 is an enlarged fragmentary perspective view of the machine in FIG. 1 with the cover in the open position showing particularly the arrangement of the agitators in the tub;

FIG. 4 is a perspective view of a pair of agitators useful with the present invention.

Figure 5:
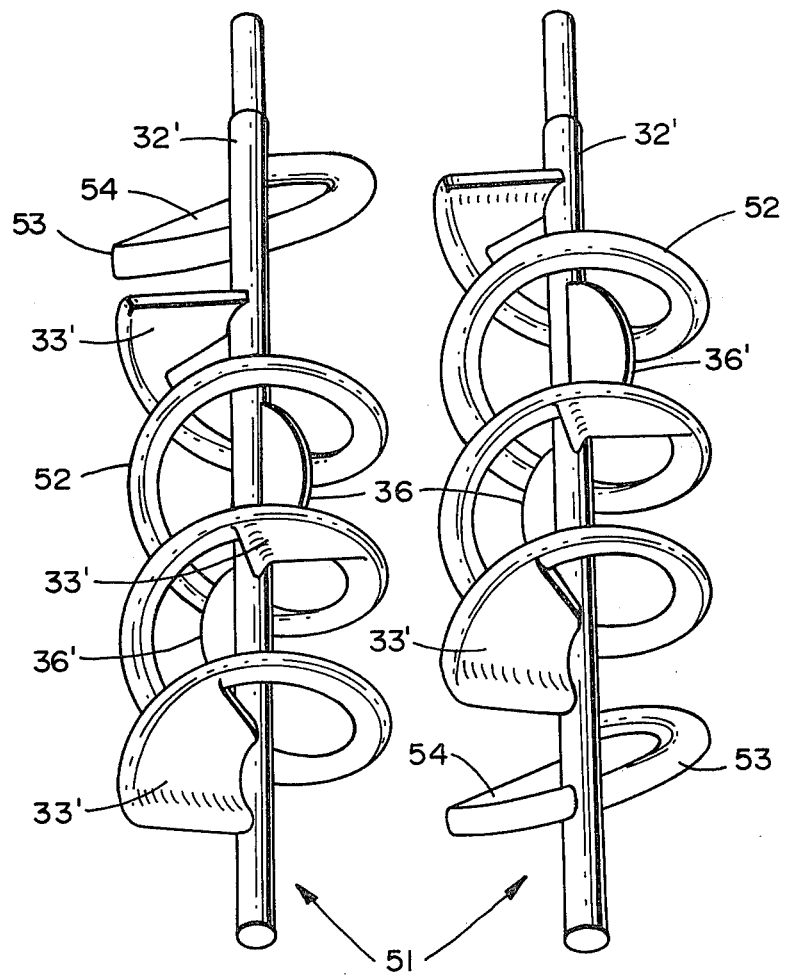
FIG. 5 is a view like FIG. 4, but from the opposite end of the shafts and illustrating another preferred form of agitator useful with the present invention.

A massager 10 incorporating the principles of the present invention is shown in the drawings and includes a cover 11 hinged to a meat container or tub 12 configurated to receive two similarly constructed agitators 13 (e.g. same hand twist to the helix) driven by hydraulic motors 14. This apparatus is mounted upon a four legged stand 16 as shown in FIGS. 1-3. The massager 10 may be constructed to "work" large sections of meat with the meat capacity of a machine of this design being from 1,000 to 15,000 pounds. It will be understood that the massager 10 is intended to accommodate large meat sections weighing from 5 to 25 pounds each and having a volume extending on the small size to that of about a softball to on the large size of about that of a basketball. These meat sections are derived from the leg portions of the animal and the meat sections are boned and pickled prior to treatment in the massager 10. Because the muscle sections are the "prime" portions of the animal great care should be taken in processing them so as to avoid tears, bruises and cutting of the muscle which would result in a downgraded product with consequent economic loss to the meat processor.

The massager 10 is constructed to operate normally with the cover 11 in the closed condition as shown in FIGS. 1 and 2 and is equipped with a cover seal (not shown) which permits a partial vacuum to be drawn in the interior volume contained by the cover 11 and tub 12. Inspection portholes 17 equipped with transparent sealed panels permit the machine operator to observe progress of operations within the unit. The cover 11 is hinged by mechanism 18, FIG. 3, to the rectangular stiffener 19 and the tub 12 is loaded with product through the top with the cover in the open condition. The product is discharged from the tub through a discharge end 21 equipped with doors 22 which swing upwardly upon actuation of hydraulic (or pneumatic) door cylinders 23 with preferably two cylinders 23 serving to actuate each door 22 through the cylinder rods 24 and levers 26. Suitable door lock mechanism (not shown) secures the door in the closed position during operation of massager 10.

As shown in FIG. 3, tub 12 is generally rectilinear in plan and is provided with the box beams 19 which serve as stiffeners between the drive end 27 and discharge end 21. As shown in FIG. 2, the tub 12 in transverse cross section is provided with curved sidewalls 28 which extend from a central ridge beam or keel 29 upwardly to the box beams 19 with the angle of sidewall curvature being on the order of 200°–215° of angle on each side of the tub and formed on a radius coaxial with the agitator axis. Viewed in another way the curved sidewalls 28 extend from the box beam 19 at about the one o'clock position around to the keel 29 ending at about the eight o'clock position.

The tubular ribbon 31 of the agitator 13 is formed to follow closely the curvature of the sidewall 28 and the helix 31 is preferably of circular cross section so as to present the sidewall 28 little if any sharp or abrupt surfaces which could cause pinching or abrading of the meat product. The ribbon 31 may be formed of tubing rolled into helix and it has been found that the tubular cross sectional shape of the ribbon is substantially superior to a rectangular cross section found in bar stock or plates. These would present sharp edges to the sidewalls swept by the ribbon. The tubular helix 31 may be formed in a two pitch or two and a half pitch configuration with an outside radius on the order of one-half inch shorter than the inside radius of the curved sidewall 28. Both agitators are made with the same direction or "hand" of helix.

The helical ribbon 31 of the agitator 13 is mounted to a central shaft 32 by a plurality of baffles of fluke-like configuration 33, FIGS. 3 and 4, with a baffle 33 being disposed at each end of the ribbon and with another baffle 33 arranged centrally of the ribbon. The baffles 33 are of closed construction and are provided with rounded free or exposed edges to minimize the possibility of injury to the large meat product encountered by the baffle. Each baffle includes a portion 33A extending generally radially outwardly in spoke-like fashion from the shaft 32, with the portion 33A being smoothly joined to another portion 33B which extends generally axially of the shaft 32, best shown in FIG. 3. Opposite from the central baffle 33 there is mounted to the shaft 32 a baffle 36 of a second type having smoothly curved exposed edges which projects into the gap or space between convolutions of the helix, best shown in FIG. 3. The baffle 36 extends generally in direction of the shaft 32 but is somewhat skewed in orientation from true axial alignment therewith.

As shown in FIGS. 2 and 3, the agitators 13 are mounted within the tub 12 in a spaced apart relationship so as to provide a zone or space 37 into which no portion of the agitator intrudes. The direction of a rotation of the agitators is upward, counter-rotational as indicated by the arrows 38 so that when the tub is filled with meat product the baffles 33, 36 lift the product from the bottom of the tub towards the top pushing product against product and against the downwards gravitational forces of the product load. Product may initially fill this tub to the level indicated in FIG. 2 by the broken line 39.

The shaft 32 of the agitator 13 is mounted at each end in a suitable pillow block bearing assembly 41 arranged on the discharge end wall 21 and the drive end wall 36. The hydraulic drive motor 14 is coupled to the shaft 32 through a gear reducer 43 permitting a large variation in rotational speeds to be selected by the operator for achieving the desired massaging results. An electrically driven, hydraulic pump unit 44 with an associated sump and filter unit is mounted on the stand 16 for supplying hydraulic power through the lines 46 to the motor 14. Thus operation of the pump unit 44 will supply hydraulic fluid under pressure to the two drive motors 14 for rotating the agitator shafts 13 in the direction of the arrows 38.

In the operation of the massager 10, a supply of meat (not shown) is loaded into the tub 12 to about the product line level as indicated by the broken line 39, in FIG. 2. The meat product, for example, may be whole boneless hams weighing in the range from 12 to 25 pounds per piece with the total load on the order of 2,000 pounds. The meat product represents a substantial investment because it is the prime cut from the animal and has already been boned and pickled, and in certain cases macerated, before introduction into the massager 10 to further stimulate the release of the salt soluble proteins, actin, myosin, from the product. The cover 11 is closed and sealed, FIG. 1, and a vacuum is drawn on the interior volume contained by the cover 11 and 12. The discharge doors 22 were previously closed and sealed. The electro-hydraulic pump unit 44 is set in operation to supply pressurized hydraulic fluid into the drive motors 14 for rotating the agitators 13 in the direction of the arrows 38, FIGS. 2 and 3. The meat product fills the space 37 between the agitators with the product above pressing downwardly and against the rotation of the agitator. The product is lifted by the baffles 33, 36 upwardly against the product disposed thereabove so that the massage action is substantially product being rubbed or pushed against product as contrasted to product being engaged by forceful agitators, rotors and the like of the prior art. The path of movement of the product in the unit 10 is found to be quite random from side to side, back and forth, with very good results in the mixing in that product has been found to be uniform in consistency and virtually free from blemishes, bruises and tears resulting from the massaging action.

Some of the advantages of enshrouding the agitators with the sidewalls of the tub extending along the agitators and above the horizontal plane through their axes is that the product does not tend to wedge itself between the ribbon and the sidewall but instead falls towards the bottom of the tub in the gap between the ribbon convolutions. The possibility of wedging or pinching action between the ribbon and the sidewalls is further minimized by the close spacing between the agitator and the sidewall—on the order of ½ in.—which discourages the larger pieces of meat massaged in this unit from becoming wedged or pinched between the agitator and sidewalls as was common in certain of the prior art massagers.

Referring to FIG. 5 of the drawings, another form of agitator 51 is illustrated there in a view like FIG. 4 but taken from the opposite end of the agitator shafts and thus we are looking in FIG. 5 at the discharge end of the agitators whereas as in FIG. 4 the view of the agitators was from the drive end. The agitator 51 contains a number of components of a configuration common with like components in the agitator 31 previously described. The like components have been designated in FIG. 5 with like numbers but with a "prime" above each number and these include the shaft 32', the baffle 33', and the second baffle 36'. A helical ribbon 52 on the agitators 51 is similar to the helical ribbon 31 described above but is somewhat shorter in length terminating in a baffle 33' at a distance spaced from the end of the shaft 32'. However, the helical ribbon 52 is preferably of the same circular lateral cross-section and is joined to the shaft by the plurality of baffles of fluke-like configuration 33', a baffle 33' being disposed at each end of the ribbon 52 and another baffle 33' being arranged centrally along the ribbon 52. It will be observed that two baffles of the second type 36' are disposed on the shaft 32' as indicated in FIG. 5. The helical ribbon 52 is constructed with respect to the inside diameter of the tub 12 to have substantially the same relationship as described above in connection with the ribbon 31 of the agitator 13.

A short reversing ribbon 53 of a diameter like that of the ribbon 52 is arranged at one end of each shaft 32' as shown in FIG. 5. The reversing ribbon 53 is connected to the shaft 32' by a baffle 54 and serves to transfer product across to the opposite agitator 51 and to reduce the pressure of product being forced against the adjacent end walls 21, 27 of the tub 12. In other words, the reversing ribbon 53 serves in the random recirculation pattern to move the product away from the end walls 21, 27 of the tub 12 while yet transferring the product across the central portion of the tub towards the other agitator 51 where the product then moves to another location within tub 12. The direction of the helix or twists of the reversing ribbon 53 is opposite to that of the ribbon 52 and, for example, if the ribbon 52 is of right-hand twist then the reversing ribbon 54 is formed to left-hand twist. Further, the reversing ribbon 53 is positioned on the right-hand agitator as viewed in FIG. 3 adjacent to the discharge end 21 and on the left-hand agitator as viewed from FIG. 3 adjacent to the drive end 27.

It has been found that the use of the agitators 51 including the reversing ribbons 52 further diminishes pinching and tearing of product by the massager unit 10 and fulfills the objectives of the invention outlined above.

It will be seen from the above that the massager 10 fulfills the objects and advantages of this invention to give a satisfactory massage action to batches of meat weighing 1,000 to 15,000 pounds within from 30 to 55 minutes. Upon completion of the massage cycle, the door cylinders 23 are actuated to open the discharge doors 22 with the agitators moving at a slower speed so that the product may be removed from the tub into a container (not shown) disposed below the discharge doors 22.

What is claimed is:

1. Apparatus for massaging meat in pieces containing large muscle sections comprising, a tub having at one end a product discharge, means serving selectively to open and to close said product discharge, a spaced apart pair of agitators including shafts extending longitudinally and mounted for rotation in said tub, drive means coupled to each shaft adjacent the end of said tub opposite from the discharge end and operative to drive said pair of shafts in upward counter-rotation, each agitator including a ribbon extending about each shaft in a helix coaxially with such shaft, said helix being circular in transverse cross section and having a smooth peripheral surface, the ribbon on one shaft being spaced apart from the ribbon on the other shaft so that during rotation of such shafts the respective ribbons are not overlapped but are freely spaced from each other, the inside wall surfaces of such tub being curved to enshroud each said helical ribbon over a rotational angle greater than 180°, first and second baffles arranged on each shaft, said first baffle extending from said shaft to said ribbon and including a portion extending generally axially of said shaft and another portion extending generally radially of said shaft, each shaft adjacent to the end walls of said tub being equipped with said first baffle, said second baffle being arranged on said shaft generally centrally along its length and extending generally axially of said shaft to project outwardly therefrom into a gap of the ribbon helix, said baffles and said ribbons serving to urge the meat product away from the sidewalls of said tub towards the medial portion of the tub in a motion wherein the product is urged upwardly to maximize the massaging action of the product pieces upon each other and to minimize and reduce pinching action of the product against the sidewalls of the tub.

2. The apparatus of claim 1 wherein said helical ribbon extends along said shaft for at least two revolutions of the helix.

3. The apparatus of claim 1 wherein a first baffle is mounted to said shaft in a central section thereof and opposite from the second baffle, said first and second baffles coacting to lift the product from the bottom towards the top of the tub.

4. The apparatus of claim 1 wherein the sidewalls of said tub enshroud each of the ribbon helix to the extent of about 210° of rotation angle.

5. The apparatus of claim 1 wherein cover means are provided for closing the upper portions of said tub, and sealing means are arranged between said cover means and said tub serving to permit a partial vacuum to be established in said tub during operation of said apparatus.

6. The apparatus of claim 1 wherein said helical ribbon on each said shaft extends in the same hand helical pattern.

7. The meat massaging apparatus of claim 1 wherein at least one of said agitators includes a reversing ribbon extending about the shaft of such agitator in a helix coaxial with such shaft, said reversing ribbon terminating adjacent to an end wall of said tub and serving to reduce product pressing against the adjacent end wall.

8. The meat massaging apparatus of claim 7 wherein said reversing ribbon is formed to the opposite hand helix as said first mentioned ribbon, and each said agitator is provided with such reversing ribbon, each reversing ribbon being disposed adjacent to different end wall of said tub.

9. The meat massaging apparatus of claim 7 wherein said first baffle means on said shaft extend to said reversing ribbon.

* * * * *